Patented Feb. 23, 1926.

1,574,337

UNITED STATES PATENT OFFICE.

MARSTON TAYLOR BOGERT, OF NEW YORK, N. Y.

DYESTUFF INTERMEDIATES.

No Drawing.   Application filed October 15, 1924.  Serial No. 743,848.

*To all whom it may concern:*

Be it known that I, MARSTON TAYLOR BOGERT, a citizen of the United States, and resident of the borough of Manhattan, in the city and State of New York, have invented a new and useful Improvement in Dyestuff Intermediates, of which the following is a specification.

This invention relates to the manufacture and production of new dyestuff intermediates. These new intermediates are the 2, 4-diaminodiaryl ethers, the simplest of which is probably represented by the following constitutional formula,

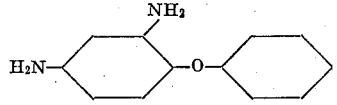

1, 3-diaminobenzene, known also as meta-phenylenediamine, is used for the production of many important dyes and other chemicals. 2, 4-diaminodiaryl ethers have their 2-amino groups likewise in the meta relationship, and also yield dyes and other useful chemicals by reactions, processes and methods similar to those commonly employed for the conversion of meta-phenylenediamine into valuable products.

Previous attempts to obtain 2, 4-diaminodiaryl ethers by the reduction of 2, 4-dinitrodiaryl ethers, or by other methods, have failed hitherto. (Vide Cook, J. Am. Chem. Sec. 32, 1292, (1910).)

I have now found that, under proper conditions, 2, 4-dinitrodiaryl ethers, or 2, 4-nitroaminodiaryl ethers, can be reduced to the corresponding 2, 4-diaminodiaryl ethers with excellent yields, and that such 2, 4-diaminodiaryl ethers can be used for the manufacture of dyestuffs and other useful substances by applying to them reactions, methods and processes, similar to those now in common use for the manufacture of analogous products from meta-phenylenediamine itself.

The following specific examples will illustrate the invention, but it is to be understood that the invention is not limited thereto. The parts are by weight.

In Examples 1 and 2, processes are described by which the desired 2, 4-diaminodiaryl ethers can be manufactured, but the same products can be produced by other methods of reduction under proper conditions, and it is to be understood that the invention covers also other standard methods of reduction by which 2, 4-dinitrodiaryl ethers, or 2, 4-nitroaminodiaryl ethers, can be so reduced.

*Example 1.—Production of the diamine from the dinitro compound.*

A mixture of 250 parts of iron powder and 1000 parts of water is placed in a vessel equipped with a reflux condenser and stirrer, and 20–40 parts of concentrated hydrochloric acid is run in. The stirrer is set in operaton and the temperature of the mixture raised to 80–100° C. To this hot mixture, 100 parts of 2, 4-dinitrodiphenyl ether is added in the course of an hour. After continuing the stirring at the same temperature for 10–12 hours longer, sufficient caustic soda is added to neutralize the acid and precipitate all iron in solution. After a further brief (15–20 minutes) heating and stirring, the mixture is passed hot thru a vacuum filter. The undissolved material thus separated is washed first with hot alcohol and then with benzene, and the washings are added to the first filtrate. The mixture of filtrate and washings is extracted by treatment with 120 parts of concentrated hydrochloric acid and 10 parts of sodium bisulfite. The aqueous acid extract is filtered and the filtrate concentrated under reduced pressure. The crude hydrochloride which crystallizes out is redissolved in boiling alcohol, an equal volume of benzene added, and the boiling solution filtered. The hydrochloride of the diaminodiphenyl ether crystallizes from the filtrate in beautiful pearly plates, readily soluble in alcohol, but difficultly soluble in benzene, which soften at about 190° C. and are completely melted at about 210° C. These crystals are treated with an equivalent amount of caustic soda solution containing some sodium hydrosulfite, and the mixture is then extracted with hot benzene. The free diaminodiphenyl ether crystallizes from the benzene as it cools and is purified by recrystallization from the same solvent. Yield, 68 parts. The pure compound forms colorless, or pale grayish, diamond-shaped crystals, melting at about 67° C., corr., which are quite stable in the air and discolor but very slowly on standing, and can be distilled under reduced pressure. Its diacetyl derivative melts at about 171° C., corr.

Example 2.—Production of the diamine from a nitroaminodiaryl ether.

A mixture of 18 parts of iron powder, one part of hydrochloric acid (37%) and 250 parts of water is warmed to 80° C., and 23 parts of 2-nitro-4-aminodiphenyl ether added. The mixture is refluxed and stirred mechanically for 4 hours. Two parts of caustic soda are added, the mixture filtered, the filtrate extracted with benzene, the benzene solution dried and the solvent removed. Yield, 18 parts of the diamine. Instead of the 2-nitro-4-aminodiphenyl ether, the 2-amino-4-nitrodiphenyl ether may be used, with similar results.

What I claim is:—

1. As new products, the dyestuff intermediates comprising products obtainable by reduction of 2, 4-dinitrodiaryl ethers, or of 2, 4-nitroaminodiaryl ethers, and having the following probable constitution:

$$(2,4)(H_2N)_2Ar.O.Ar,$$

wherein Ar. denotes an aryl group; said intermediates being crystalline solids of definite melting points, of weakly basic properties, and which yield useful dyestuffs by reactions, processes and methods, similar to those in common use for the production of analogous dyestuffs from meta-phenylenediamine.

2. As a new product, the compound of the following probable constitution:

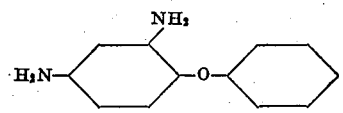

which results from the reduction of 2, 4-dinitrodiphenyl ether, or of 2-nitro-4-aminodiphenyl ether, or of 2-amino-4-nitrodiphenyl ether, and which crystallizes from benzene in colorless or pale grayish diamond-shaped crystals, melting at about 67° C., corr., which are quite stable in the air, discolor but very slowly on standing, can be distilled under reduced pressure, and whose hydrochloride crystallizes from a mixture of benzene and alcohol in pearly plates, easily soluble in alcohol, but more difficultly in benzene, which soften at about 190° C., and are completely melted at about 210° C. and whose diacetyl derivative melts at about 171° C., corr.

In testimony, that I claim the foregoing as my invention, I have signed my name this 10th day of October, 1924.

MARSTON TAYLOR BOGERT.